(12) United States Patent
Kibler (10) Patent No.: US 12,326,211 B2
(45) Date of Patent: Jun. 10, 2025

(54) TAKE-UP DEVICE

(71) Applicant: Groupe Save, Merignac (FR)

(72) Inventor: Philippe Kibler, Ternay (FR)

(73) Assignee: Groupe Save, Merignac (FR)

( * ) Notice: Subject to any disclaimer, the term of this patent is extended or adjusted under 35 U.S.C. 154(b) by 8 days.

(21) Appl. No.: 18/279,852

(22) PCT Filed: Mar. 4, 2022

(86) PCT No.: PCT/FR2022/050393
§ 371 (c)(1),
(2) Date: Aug. 31, 2023

(87) PCT Pub. No.: WO2022/189738
PCT Pub. Date: Sep. 15, 2022

(65) Prior Publication Data
US 2024/0159344 A1    May 16, 2024

(30) Foreign Application Priority Data

Mar. 11, 2021    (FR) ...................................... 2102426
May 28, 2021    (FR) ...................................... 2105559

(51) Int. Cl.
*F16L 41/12*    (2006.01)
*A62C 35/68*    (2006.01)
*F16L 41/00*    (2006.01)

(52) U.S. Cl.
CPC .............. *F16L 41/12* (2013.01); *A62C 35/68* (2013.01); *F16L 41/008* (2013.01)

(58) Field of Classification Search
CPC ......... F16L 41/04; F16L 41/06; F16L 41/065; F16L 41/08; F16L 41/12; F16L 2201/60; A62C 35/68
(Continued)

(56) References Cited

U.S. PATENT DOCUMENTS 2,795,439 A * 6/1957 Smith ...................... F16L 41/12
2,884,265 A    4/1959 Boughton
(Continued)

FOREIGN PATENT DOCUMENTS

BR    202019015241 U2 *    2/2021 .............. F16L 41/12
CN    209302086 U       8/2019
(Continued)

OTHER PUBLICATIONS

JP-09152084-A—Machine Translation—English (Year: 1997).*
(Continued)

*Primary Examiner* — William S. Choi
(74) *Attorney, Agent, or Firm* — MARSHALL, GERSTEIN & BORUN LLP (57) ABSTRACT

A take-up device intended to be mounted on an opening of a pipeline includes a base having a through-hole, and a seal intended for sealing the connection between the opening of said pipeline and the through-hole of the base. The base also includes at least two anchoring points, and the device includes a clamping collar including an elongate element intended to partially surround the pipeline. The elongate element is mounted on the base by inserting the ends of the elongate element in the through-openings and forming a loop around the edges of the base. The length of the clamping collar is adjustable so that the device is able to be mounted on pipelines of different diameters.

13 Claims, 10 Drawing Sheets

(58) Field of Classification Search
USPC .......................................................... 285/197
See application file for complete search history.

(56) References Cited

U.S. PATENT DOCUMENTS

| | | | | |
|---|---|---|---|---|
| 3,298,717 | A * | 1/1967 | Rothwell | ................ F16L 41/12 |
| | | | | 285/197 |
| 3,471,176 | A * | 10/1969 | Gilchrist | ................ F16L 41/06 |
| | | | | 285/197 |
| 3,663,042 | A | 5/1972 | Fowler | |
| 3,687,490 | A * | 8/1972 | Dunmire | ................ F16L 41/06 |
| | | | | 285/197 |
| 3,967,839 | A * | 7/1976 | Dunmire | ................ F16L 41/12 |
| 4,019,581 | A | 4/1977 | Diggs | |
| 4,494,780 | A * | 1/1985 | Burnett | ................ F16L 41/12 |
| 4,966,397 | A * | 10/1990 | McKinnon | ..................... 285/197 |
| 5,169,177 | A * | 12/1992 | McLennan | ............. F16L 41/12 |
| | | | | 285/197 |
| 5,199,749 | A * | 4/1993 | Corcoran | ................ F16L 41/12 |
| | | | | 285/197 |
| 10,436,350 | B1 * | 10/2019 | Ehsani | |
| 2006/0151996 | A1 * | 7/2006 | Lang | ....................... F16L 41/12 |
| | | | | 285/197 |

FOREIGN PATENT DOCUMENTS

| | | | |
|---|---|---|---|
| DE | 3812189 A1 | 10/1989 | |
| DE | 9106943 U1 | 7/1991 | |
| DE | 20106522 U1 | 7/2001 | |
| FR | 2402825 A1 | 4/1979 | |
| FR | 2785359 A1 * | 5/2000 | ............. F16L 41/06 |
| FR | 2785359 B1 | 1/2001 | |
| JP | 09152084 A * | 6/1997 | ............. F16L 41/06 |
| JP | H09152084 A | 6/1997 | |
| KR | 20070106101 A | 11/2007 | |
| WO | WO-2018014066 A1 | 1/2018 | |

OTHER PUBLICATIONS

FR-2785359-A1—Machine Translation—English (Year: 2000).*
BR-202019015241-U2—Machine Translation—English (Year: 2021).*
International Search Report and Written Opinion, corresponding International Application No. PCT/FR2022/050393, mailing date May 27, 2022.
Office Action, UAE patent application No. P6002265/2023, dated Feb. 28, 2025.

* cited by examiner

TAKE-UP DEVICE

TECHNOLOGICAL FIELD

The present invention relates to the field of take-up collars for connecting a device such as a bypass conduit or a pressure or temperature sensor to a main pipeline. In particular, the invention relates to a take-up device intended to be mounted on an opening of a pipeline including at least one clamping collar the diameter of which adapts to several pipeline diameters. In particular, the invention enables the take-up device to be adapted in situ to several types of pre-existing pipelines.

BACKGROUND

Many devices exist for producing a bypass on a main pipeline, to connect either another conduit or a device such as a measurement sensor, for example.

Bypass devices of the prior art, also known as "bypass collars", or indeed "take-up collars", are traditionally constituted by a rigid base intended to be positioned in a sealed manner on the main pipeline, facing a bypass orifice. To this end, the base can, for example, comprise a lower portion intended to penetrate into the orifice. A seal can also be disposed between the base and the orifice of the pipeline. The bypass devices further comprise a flexible flange cooperating with the base to hold it on the conduit.

Document U.S. Pat. No. 4,435,476 discloses a bypass device comprising a tubular portion in the form of an elbow. One of the ends of the elbow has a circular seal positioned so that the end of the elbow protrudes below the seal. This end is intended to be inserted into the orifice of the main pipeline. The seal, with a diameter which is greater than the diameter of the orifice, is intended to rest on the pipeline to seal it. The flange is formed by a circular collar comprising a central opening. The collar is inserted around the tubular portion in order to rest the collar on the seal. Thus, when the collar is closed around the pipeline, it compresses the seal against the pipeline orifice.

However, that system does not make it possible to fit several types of devices on the pipeline. In fact, the opening of the collar has a secured diameter, which limits the shapes and the dimensions of the added devices. In fact, the device must comprise a portion with a diameter that is less than or equal to the opening of the collar in order to be able to slide the collar onto the device, and a portion with a diameter that is greater than the opening so that the collar can hold the device against the pipeline.

Document FR 2 933 764 describes a bypass device comprising a saddle provided with a through opening comprising a thread and making it possible, for example, to screw a bypass pipe into it. The saddle also comprises means for fastening a flexible strip. The securing means include a through opening, provided on one end of the saddle and enabling the flexible strip to be inserted and locked by means of a tongue. The other end of the saddle has a pivoting metal rod system for winding up the flexible strip. The rod and the end of the strip comprise an opening for receiving a screw which, on the one hand, blocks the rotation of the rod and, on the other hand, holds the strip on the rod.

That system has asymmetrical means for fastening the flexible strip, which complicates mounting of the device on the pipeline. Furthermore, the production of such a device is very complicated and expensive.

The technical problem that the invention proposes to solve is therefore to develop a bypass device which can be adapted to several pipe diameters and which is easier and less expensive to produce than the devices of the prior art.

SUMMARY OF THE DISCLOSURE

To solve this problem, the invention proposes the development of a take-up device comprising at least one clamping collar produced from a flexible material, enabling it to be adapted to the shape and size of several types of pipelines.

Against all expectations, the flexible clamping collars of the invention can also replace the rigid collars of the prior art intended for installations withstanding high pressures.

In fact, a person skilled in the art would naturally be led to think that the flexible clamping collars of the invention present too great a risk of wear and deformation, especially when they are subjected to pressures comprised between 5 and 20 bar and, more precisely, between 8 and 12 bar. A person skilled in the art would therefore have avoided using these clamping collars in order to limit the safety risks.

The invention therefore stems from a discovery according to which such a device can be adapted to a pipeline within which a high pressure prevails, typically a pipeline of a fire protection installation in which the pressure is comprised between 5 and 20 bar and more precisely between 8 and 12 bar.

Thus, the invention concerns a take-up device intended to be mounted on an opening of a pipeline, said pipeline being comprised in an installation, said device comprising:
  a one-piece base with a through hole,
  a seal intended to seal the connection between the opening of said pipeline and the through hole of said base.
Such a device is characterized in that:
  the base further comprises at least two anchoring points, and
  the device comprises at least one clamping collar comprising:
    an elongate element intended to partially surround the pipeline, said elongate element cooperating with the base at said anchoring points, and
    adjustment means which are independent of the base, enabling the length of the at least one clamping collar to be adapted so that the device is capable of being mounted on pipelines with different diameters.

Put another way, the adjustment means make it possible to adapt the length of the clamping collar with respect to the diameter of the pipeline. As an example, the collar may have a sufficient length to accommodate diameters comprised between 25 and 50 mm.

In order to obtain this adaptability, the adjustment means may be in the form of a clasp, cooperating with notches provided in the elongate element.

The adjustment means are also independent of the base in order to be positioned in a zone distant from the base and thus be better able to withstand the compressive loads being exerted on the opening of the pipeline. In fact, the further the adjustment means are from the base, the better the clamping collar can withstand elongation, deformation and rupture.

Preferably, the adjustment means are installed diametrically opposite the opening of the pipeline, in order to best compensate for the compressive force exerted on the base from the opening of the pipeline. Because the tension is exerted around the pipeline, it is therefore better distributed.

In accordance with the invention, the base is a single piece, i.e. the base is a part formed in one piece, as opposed to a part resulting from assembling several constituent elements as described, for example, in document WO 2018/014066. In view of the high pressures exerted, the use of a one-piece base makes it possible to guarantee long-term resistance for a guaranteed duration of operation, for example for 5 or 10 years of operation.

The combination of the seal, the adjustment means and the elongate element cooperating with the base makes it possible to guarantee the tightness of the connection between the pipeline and the take-up device as well as the adaptability of the clamping collar to different pipeline diameters. In fact, the elongate element makes it possible to press the base against the pipeline, whereupon the seal, interposed between the base and the pipeline, is compressed. Under the traction of the elongate element on the base, the seal deforms to guarantee sealing of the base around the through hole of the pipeline and to match the curvature of the pipeline. Thus, under the pressure of the base, the seal makes it possible to absorb the differences in curvature between the pipeline and the base. In addition, the adjustment means make it possible to secure the elongate element in a position in which the seal is compressed, so that the compressive capability of the seal also overcomes the lack of graduality of the fixing positions of the clamping means.

It follows that the traction exerted by the elongate element on the base, the modularity of the adjustment means and the deformation capacity of the seal make it possible to adapt the take-up device to pipelines with a variety of diameters.

Furthermore, the adjustment means and the elongate element are long-lasting, i.e. they do not deform or malfunction over time. The connection therefore remains permanently tight.

In addition, the combination of the adjustment means and the seal also makes it possible to adapt the length of the clamping collar to very small variations in the diameter of the pipeline due to manufacturing tolerances. In fact, among pipelines of a given diameter, for example for a diameter of 25 mm, the manufacturer's tolerance can provide a margin of ±1 mm within which the diameter of the pipeline can vary. Preferably, the notches of the adjustment means have a sufficiently small pitch to allow adaptation to the manufacturer's tolerances.

The bypass device may be positioned at any orientation with respect to the pipeline, provided that it is secured at an opening of the pipeline. By way of example, the device may be positioned above, below or to the side of the pipeline.

The length of the clamping collars corresponds to the useful portion of the collars, which is intended to be positioned against the walls of the pipeline. In fact, a clamping collar may have a fixed total length, but during adjustment, only a portion of the collar may effectively be used to hold the bypass device against the pipeline. The non-useful portion may optionally be cut so as not to interfere with the maintenance of the installation.

In addition, clamping collars which can be adapted to several pipeline diameters make it possible to limit the number of reference collar sizes, which limits production costs. Furthermore, the adjustment of the clamping collars may be carried out in a substantially continuous manner.

In one embodiment, the take-up device comprises a single clamping collar and only two anchoring points disposed on either side of the base.

In fact, a person skilled in the art would naturally think that the flexible clamping collars of the invention would be at too great a risk of wear and deformation. The person skilled in the art would therefore be led to multiply the number of clamping collars in order to reinforce the structure of the clamping collar. However, against all expectations, the invention makes it possible to use only a single clamping collar without increasing the risks of leaks, for example.

In the context of the invention, the "anchoring points" correspond to the elements for receiving the base, making it possible to secure the clamping collar when the clamping collar is clamped around the pipeline. These anchoring points may correspond to openings or protuberances, such as lugs.

In accordance with one embodiment, the anchoring points are through openings orientated in a direction parallel to the main direction of the pipeline, the elongate element being mounted on the base by inserting at least one end of the elongate element into the through openings and forming a loop around the edges of said base.

In accordance with the invention, the main direction of the pipeline corresponds to the direction parallel to the length of the pipeline.

Mounting the clamping collar on the base is therefore facilitated, because the adjustment method can easily be reproduced and requires few tools. By way of example, it suffices to traverse the two openings from bottom to top, so that the elongate element surrounds the pipeline. The ends of the slender member are then pulled from above the base and folded over the ends of the base to clamp the clamping collar around the pipeline. The ends of the elongate element are then brought together and secured by the adjustment means. Installation of the take-up devices on the pipelines is therefore speeded up overall.

In practice, the through openings may correspond to slots produced in the base. In a variation, the through openings may correspond to the space formed between the base and a pin attached to the base.

Preferably, the openings are disposed symmetrically with respect to a central axis of the base, thus making it possible to reduce the risks of incorrect positioning of the take-up device against the opening of the pipeline.

In accordance with another embodiment, the two ends of the elongate element are configured to cooperate with the anchoring points disposed on either side of the base in a manner such that the elongate element partially surrounds the pipeline following action upon the adjustment means.

In practice, each anchoring point comprises a housing delimited by two lugs, separated by a slot proportioned to enable the elongate element to pass through, the housing being intended to receive a pin secured to one end of the elongate element, the lugs being intended to enable the pins to be inserted into the housings before action upon the adjustment means and to block the extraction of said pins following action upon the adjustment means.

Mounting of the clamping collar on the base is therefore facilitated because the adjustment method can easily be reproduced and requires few tools. It suffices that the elongate element surrounds the pipeline and that its ends, equipped with a pin, are locked in the housings of the base. The clamping collar is then adapted to the diameter of the pipeline via the adjustment means. Installation of the take-up devices on the pipelines is therefore speeded up overall.

In a variation, each anchoring point comprises a lug intended to cooperate with a hole provided at the ends of the elongate element.

The clamping collar is mounted on the base by mounting the elongate element around the pipeline so that its ends, provided with a hole, are locked on the lugs of the base. The clamping collar is then adapted to the diameter of the pipeline via the adjustment means.

The elongate element may take a variety of forms. In a first form, the elongate element is a strap, that is, of similar shape to a tape. In a variation, the elongate element is a cable, thinner but nevertheless just as strong. In fact, the invention makes it possible to use elongate elements with a reduced width without compromising the safety of the installations.

In practice, the elongate element is formed from a metallic material, because surprisingly, the invention makes it possible to use different metallic materials for the production of the elongate element without compromising the safety of the installations.

Advantageously, the means for adjusting the length of the at least one clamping collar comprise markings enabling the seal to be compressed to a predetermined level.

This embodiment makes it possible to facilitate the installation of the clamping collar and to eliminate the risk of errors. The technician can rely on visible markings during installation, indicating how far to tighten the clamping collar so that the seal is compressed optimally as a function of the diameter and the service pressure, so as not to cause leaks. In a variation, these markings may be associated with or replaced by a device for measuring the adjustment tension of the clamping collar.

For these two embodiments, the openings are preferably disposed symmetrically with respect to a central axis of the base. This system thus makes it possible to reduce the risks of incorrect positioning of the take-up device to counter opening of the pipeline.

Furthermore, in a preferred embodiment, the adjustment means are integral with one end of the elongate element. In fact, this embodiment makes it possible to tighten the take-up device on the pipeline by carrying out a simple pulling movement on the free end of the elongate element.

Advantageously, a clamping collar with the above features makes it possible to simplify and reduce the time required for mounting the take-up device on the pipeline.

However, the locking system of the elongate element could be different, without any adverse effects on the proper functioning of the invention.

In accordance with another aspect, the invention concerns an installation including:
at least one pipeline having at least one opening, and
at least one take-up device as described above.

Preferably, the pipeline is a pipeline which has been painted or pre-painted on its inner and outer faces, i.e. the pipeline comprises a paint covering its inner and outer faces. The paint makes it possible to protect the pipeline from damage, in particular that caused by rust.

The paint applied must make it possible to make holes and cuts without flaking, thus considerably reducing manufacturing times in the workshop. In fact, the painting phase following manufacture which is usually carried out in the known processes is eliminated.

Preferably, the paint of the pipeline comprises an epoxy polymer binder, which is particularly resistant during drilling and cutting.

Typically, the installation may be a fire protection installation in which a value is to be measured such as, for example, a pressure value using a pressure gauge.

BRIEF DESCRIPTION OF THE FIGURES

The manner of carrying out the invention, as well as the advantages which arise from it, will become apparent from the description of the embodiments below, made with the aid of the accompanying figures in which.

DETAILED DESCRIPTION

Figure 1:
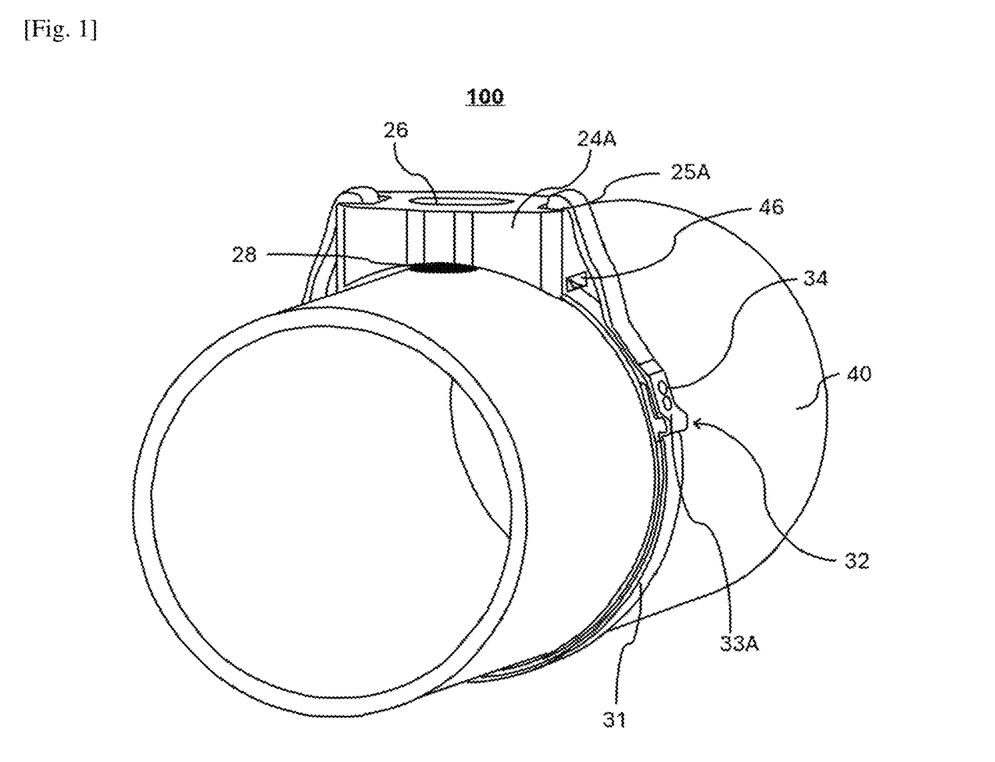
FIG. 1 is a perspective view of the bypass device mounted on a pipeline and the clamping collar in accordance with one embodiment of the invention.

As illustrated in FIG. 1, a bypass device 100, 200, 300, 400, 500, 600, 700 is mounted on an installation comprising at least one pipeline 40.

The pipeline 40 is configured to contain a fluid such as water or gas. To this end, the pipeline 40 is preferably produced from steel, stainless steel, copper or super chlorinated polyvinyl chloride. In some embodiments, the pipeline 40 may be configured to withstand pressures of the order of ten bars, for example between 5 and 20 bars and preferably between 8 and 12 bars.

In addition, the diameter of the pipeline 40 may vary, typically between 20 and 600 mm; these are also known by the acronyms "DN 20" or "DN 600".

In order to add the bypass devices 100, 200, 300, 400, 500, 600, 700 of the invention, one or more openings are provided in the pipelines 40. The openings are, for example, circular, with a diameter of between 10 and 500 mm; these are also known by the acronyms "DN 10" or "DN 500". The diameter of the opening is proportioned as a function of the diameter of the pipeline and the device to be integrated.

As illustrated in FIG. 1, the device 100, 200, 300, 400, 500, 600, 700 comprises a one-piece base 24A-24G having a substantially planar parallelepipedal shape with a thickness comprised between 0.5 and 1.5 cm. In a variation, the lower face of the base 24A-24G may have a slight curvature, as illustrated in FIG. 1. The curvature of the lower face is selected to match the curvature of the larger diameter pipeline 40 on which the device 100, 200, 300, 400, 500, 600, 700 can fit. The base 24A-24G may be obtained directly by a moulding process, by a material subtraction process such as machining or laser cutting, or in fact by an additive process such as 3D printing.

The base 24A-24G also has a through opening 26 with a diameter comprised between 10 and 500 mm.

Advantageously, a seal 28 is positioned facing the lower face of the base 24A-24G, typically between the base 24A-24G and the pipeline 40, so as to surround the openings of the base 24A-24G and the pipeline 40, respectively. By way of example, the seal 28 is a rubber O-ring with a thickness of between 0.2 and 0.7 cm. Alternatively, for larger diameter pipelines, the seal may have lips and have a thickness in the range 0.5 to 3 cm.

A device such as a bypass pipeline, a fire protection nozzle or in fact a pressure gauge, as illustrated in FIGS. 8 to 19, may be attached to the base 24A-24G by aligning the device with the through opening 26 of the base 24A-24G. as an example, the device may have a male portion having a thread and cooperating with a second thread, provided in the walls of the through opening 26 of the base 24A-24G. The device may therefore be screwed onto the base 24A-24G.

The clamping collar or clamping collars 30 enable the device to be secured and held on the pipeline 40.

The clamping collar or clamping collars 30 comprise an elongate element such as, for example, a strip with a width of between 0.5 and 2 cm, or a cable with a diameter of between 0.2 and 1 cm. in a variation, the elongate element may be a "hose clamp" type clamping element, produced from a metal material. The clamping collars 30 also comprise means 32 for adjusting the length and for tightening the clamping collar 30. The base 24A-24G may be provided with one or more clamping collars 30 depending on the needs of the installation and the diameter of the pipeline 40.

The adjustment means 32 are independent of the base 24A-24G.

As an example, the adjustment means 32 may also be independent of the elongate element 31. The means may consist of one or more inserts which can be secured or fitted on the elongate element 31 in order to hold it in place.

Figure 2:
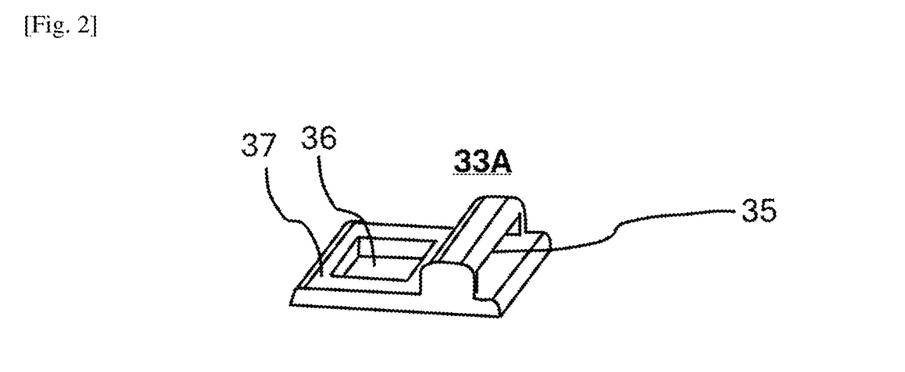
FIG. 2 is a perspective view of the clasp of the clamping collar of FIG. 1.
Figure 3:
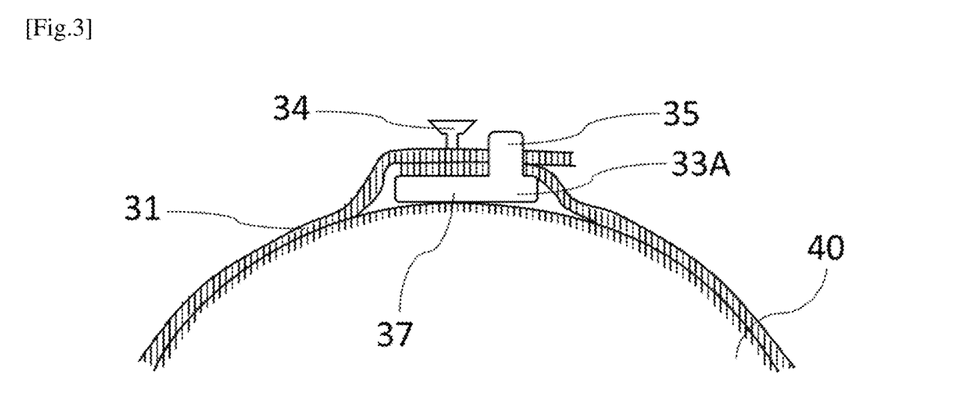
FIG. 3 is an axial sectional view of the means for adjusting the length of the clamping collar of FIG. 1.

As illustrated in FIGS. 1 to 3, the clamping collar 30 may be in the form of a metal strap 31 and the adjustment means may include a clasp 33A, independent of the strap 31, comprising a housing 35 into which the ends of the strap 31 are inserted.

Self-tapping screws 34 enable the various thicknesses of strap 31 to be pierced through. Advantageously, the clasp 33A has an opening 36 for receiving the lower portion of the body of the screw 34.

Thus, the elongate element can be directly adapted to the diameter and to the tolerances of a pipeline 40 by creating the opening necessary for the seal 28 to be compressed with an optimal level of compression and for the connection between the pipeline and the take-up device to be made as leak-tight as possible. The adjustment is "made to measure" and the possibilities for adjustment are almost continuous.

In a variation, in an embodiment not shown in the figures, the elongate element may be a metal strap comprising openings spaced regularly and closely along the elongate element. So that the elongate element can be directly adapted to the diameter and to the tolerances of a pipeline, the pitch between the openings is preferably less than or equal to the manufacturer's tolerances. Typically, if the pipeline has a diameter of 25 mm and the tolerance is ±1 mm, the pitch between the openings is less than or equal to 1 mm. Thus, the seal can be compressed with an optimal level of compression, and the connection between the pipeline and the take-up device is rendered as tight as possible.

In order to fix the base 24A on the pipeline 40, the base is positioned on the opening of the pipeline 40. The two ends of the strap 31 are inserted in a movement from bottom to top through the anchoring points produced by lateral openings 25A so that the strap 31 surrounds the pipeline 40. The ends of the strap 31 are then pulled from above the base 24A and folded over the ends of the base 24A in order to clamp the clamping collar 30 around the pipeline 40. The ends of the strap 31 are then brought together, thereby forming a loop around each edge of the base 24A. The ends of the strap 31 are then secured together by the adjustment means 32.

Thus, as illustrated in FIG. 3, the clasp 33A is positioned on a first thickness of strap 31. The ends of the strap 31 are then folded back and inserted into the housing 35 of the clasp 33A, then tightened so as to effectively hold the base 24A on the pipeline 40. To this end, the ends of the strap 31 project on each side of the housing 35 over a length of at least 1 cm. The ends of the strap 31 are therefore superimposed at the body 37 of the clasp 33A. Finally, the screw 34 is inserted at this superimposition and penetrates through the two thicknesses formed by the ends of the strap 31.

In a variation, as illustrated in FIGS. 4a to 4d, the adjustment means 32 are integral with one end of the elongate element. Thus, the clamping collar 30 may be in the form of a metal strap 31 and the adjustment means may include a clasp 33B comprising a housing 35, secured to the end of the strap 31.

The housing 35 may take the form of a tube with a parallelepipedal section, intended to allow a portion of the metal strap 31 to pass through. In addition, securing means such as a self-tapping screw 34 may be placed on the housing 35, perpendicular to the length of the tube and to the direction of movement of the strap 31 in the tube, so as to restrict displacements of the strap 31 when it is compressed around the pipeline 40 and inserted into the tube.

In an alternative embodiment, not shown, the securing means include a ball contained in the tube and intended to block displacements of the elongate element. To this end, the tube has a variable cross-section. Typically, the section of the tube narrows from dimensions greater than the diameter of the ball to dimensions substantially equal to the diameter of the ball. Thus, during sliding of the elongate element in the tube, the ball is driven in a direction opposite to the direction of insertion of the elongate element, towards the portion of the tube with reduced dimensions, where it becomes locked. The ball therefore also blocks the displacements of the elongate element.

Figure 4A:
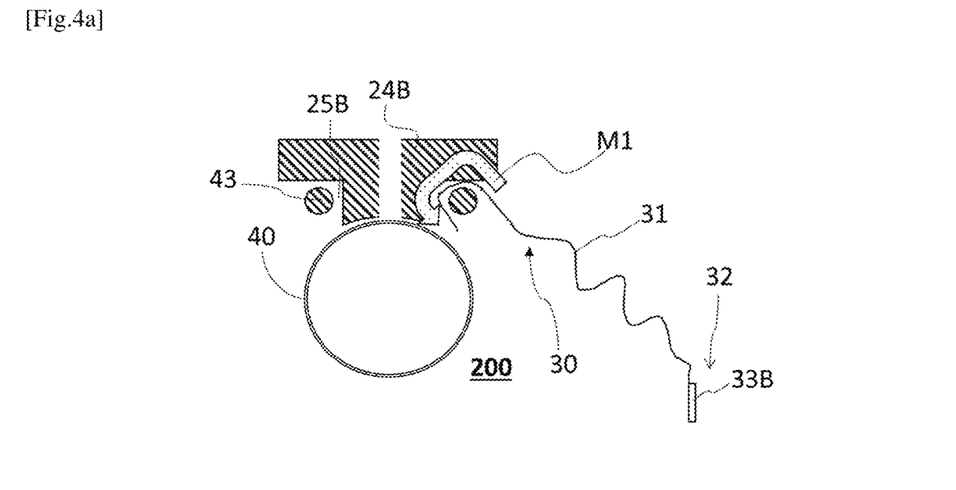
FIG. 4a is a sectional view of a first step for installation of the means for adjusting the length of the clamping collar in accordance with a second embodiment.

The spaces 25B of the base 24B are used to create securing points for the strap 31. To this end, as illustrated in FIG. 4a, the end of the strap 31 which is not provided with the clasp 33B is inserted in accordance with a first movement M1 to surround a first securing point for the base 24B. This movement M1 is carried out by inserting the strap 31 into the space 25B from the upper face of the base 24B to the lower face of the base 24B until the strap 31 is running alongside the pipeline 40.

Figure 4B:
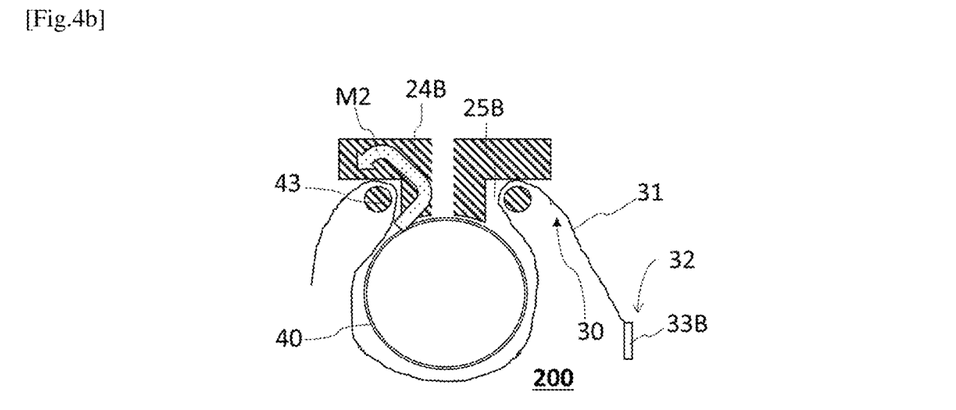
FIG. 4b is a sectional view of a second step for installation of the means for adjusting the length of the clamping collar in accordance with a second embodiment.

The strap 31 is then displaced around the pipeline 40 to the second securing point of the base 24B. As illustrated in FIG. 4*b*, the strap 31 is then introduced into the space 25B according to the movement M2 to surround the second securing point of the base 24B. This movement M2 is produced by inserting the strap 31 into the space 25B from the lower face of the base 24B to the upper face of the base 24B until the strap 31 is running alongside the pipeline 40.

Figure 4C:
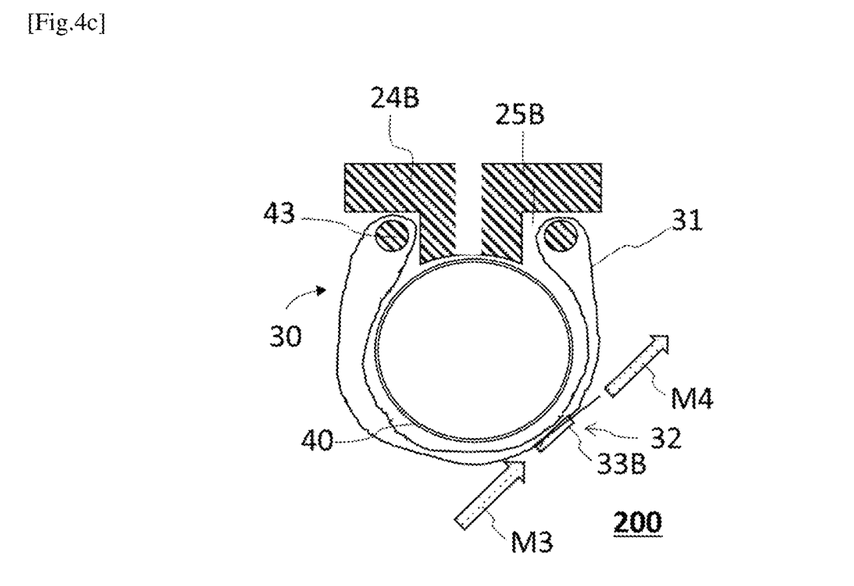
FIG. 4c is a sectional view of a third step for installation of the means for adjusting the length of the clamping collar in accordance with a second embodiment.

The strap 31 is then introduced into the clasp 33B in accordance with the movement M3, as illustrated in FIG. 4*c*. The clamping collar 30 is then compressed around the pipeline 40 by pulling on the end of the strap 33 after it has passed into the housing of the clasp 33B, in accordance with the movement M4.

Figure 4D:
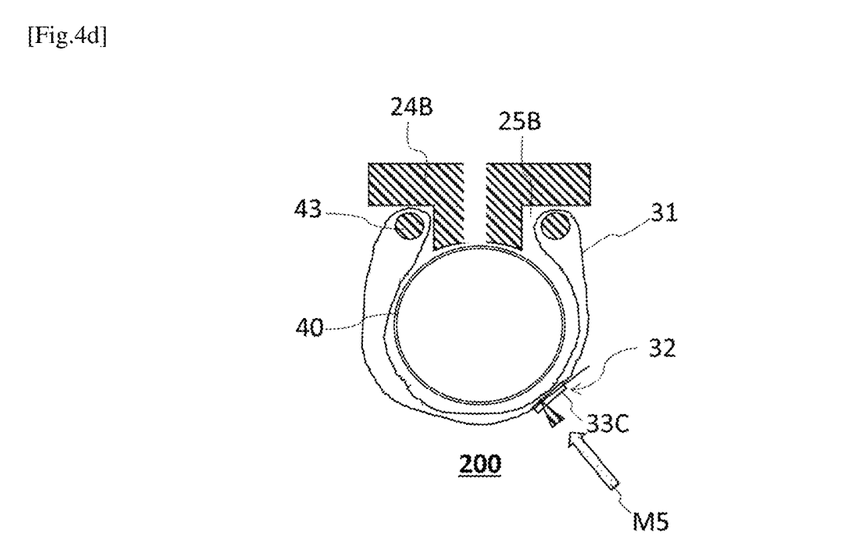
FIG. 4d is a sectional view of a third step for installation of the means for adjusting the length of the clamping collar in accordance with a third embodiment.

In certain embodiments, when the desired compressive tension of the strap 31 is attained, means for securing the strap 31 in the housing may be inserted into the clasp 33C by means of an action in a direction M5, perpendicular to the length of the housing 35, as illustrated in FIG. 4*d*. Subsequently, the remaining end of the strap 31 projecting from the clasp 33C may optionally be cut.

In addition, the elongate element 31 may also have notches or grooves for receiving or locking the adjustment means 32.

Advantageously, the clamping collar 30 also has markings, making it possible to adapt the clamping to the pressure prevailing in the pipeline 40. Similarly, the take-up device 100, 200, 300, 400, 500, 600, 700 may also include an integrated device for measuring the tension of the strap 31. Similarly, an external device may also be used to check the clamping tension.

There are a number of embodiments concerning attaching the clamping collar 30 to the base 24A-24G.

As illustrated in FIG. 1, in a first embodiment, the base 24A has a parallelepipedal shape with tapped holes at the corners, for example. The base 24A has a length of between 2 and 10 cm and a width of between 2 and 5 cm. The length of the base 24A is intended to be positioned in a direction perpendicular to the main direction D of the pipeline 40.

At its ends, the base 24A has two lateral grooves 25A provided in the thickness of the base 24A, substantially parallelepipedal in shape and intended to enable the strip 31 of the clamping collar 30 to pass through.

A bore 46 may also be provided on the lower portion of the grooves 25A, enabling the groove 25A to open to the outside. This bore 46 enables the strip 31 to adapt better to the shape of the pipeline 40.

In a variation, as illustrated in FIGS. 4*a* to 4*d*, the base 24B may have two recesses at its ends, making it possible to produce the opening 25B. The end of the recesses may have two pins 43. Thus, the strip 31 of the clamping collar 30 can pass through the openings 25B and form a loop around the pins 43.

According to another example, the base 24B may have means for securing two pins 43 attached either side of the base 24B. The pins 43 are positioned so as to leave a free space 25 between the edges of the base 24B and the pins 43. This space 25B is intended to allow the strip 31 of the clamping collar 30 to pass through, the strip then being able to form a loop around the pins 43.

Figure 5:
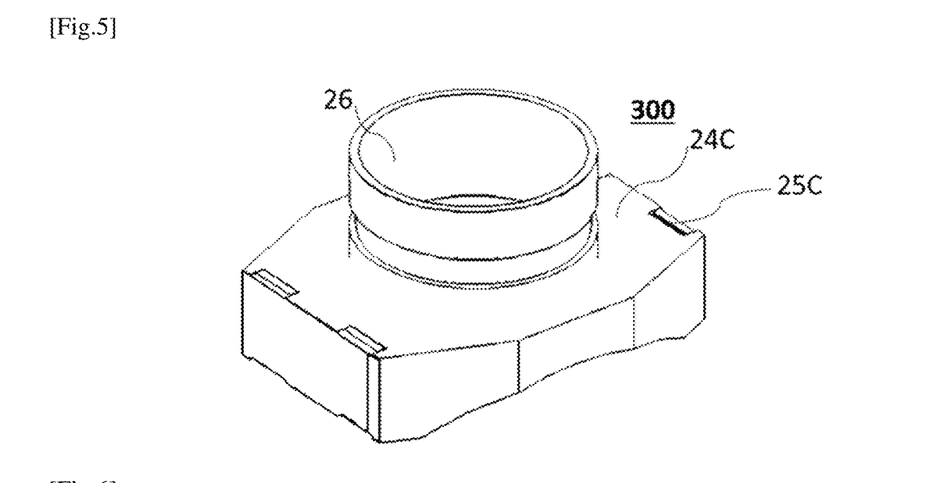
FIG. 5 is a perspective view from above of the base of a take-up device in accordance with a third embodiment of the invention.
Figure 6:
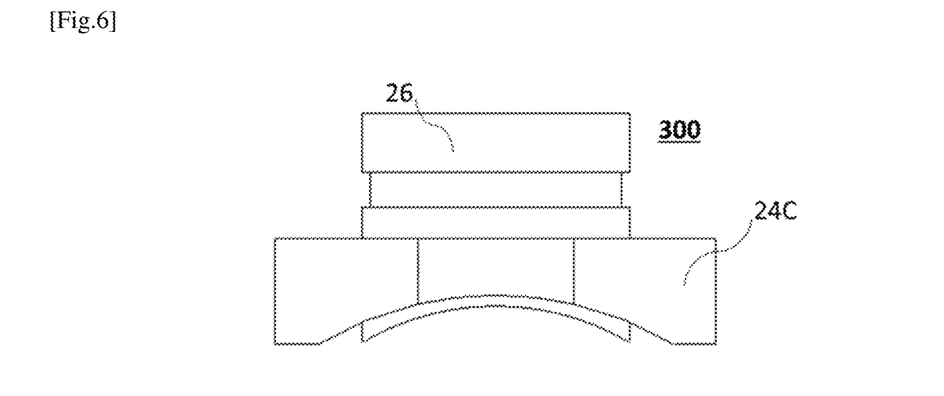
FIG. 6 is a view of the front face of the take-up device of FIG. 5.
Figure 7:
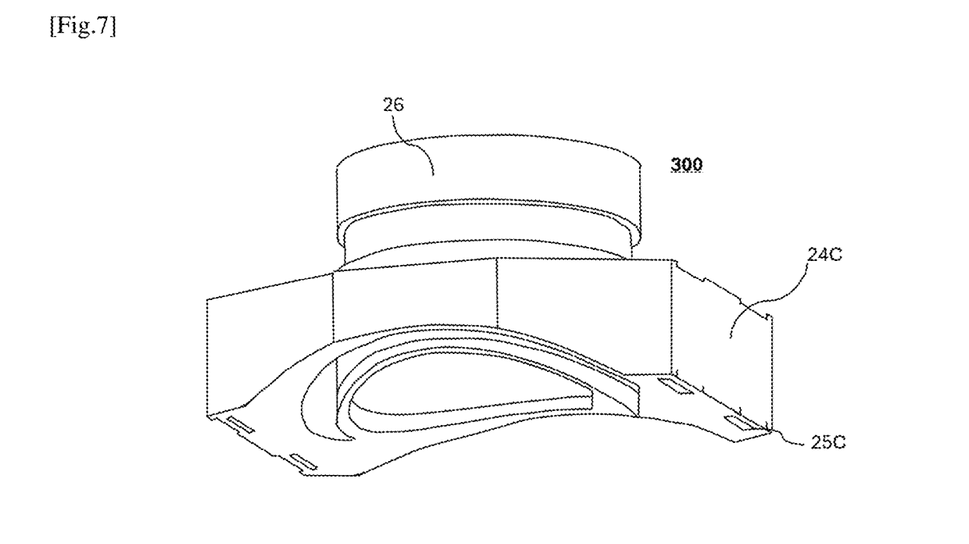
FIG. 7 is a perspective view from below of the base of the take-up device of FIG. 5.

As illustrated in FIGS. 5 to 7, in a third embodiment, the base 24C has a substantially hexagonal shape with a length of between 2 and 8 cm and a width of between 2 and 5 cm. The length of the base 24C is intended to be orientated in a direction perpendicular to the main direction D of the pipeline 40.

The base 24C also has two pairs of lateral grooves 25C provided on either side of the base 24C in the thickness of the base 24C, substantially parallelepipedal in shape and intended to allow the two clamping collars 30 to pass through. Preferably, the grooves are spaced 1 to 3 cm apart. This type of base 24C is used for pipelines 40 with a larger diameter, typically greater than DN50.

The two clamping collars 30 are mounted in the same manner as described in FIGS. 4*a*-4*d*, the clamping collars 30 being able to be mounted simultaneously or one after the other.

Figure 8:
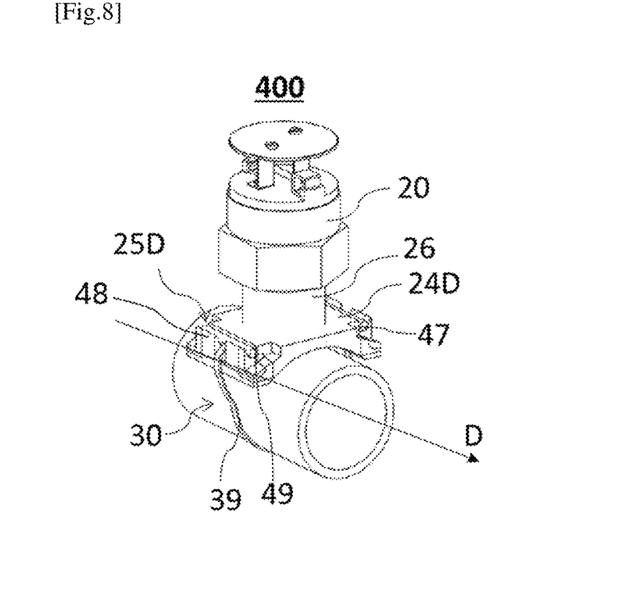
FIG. 8 is a perspective view of a take-up device in accordance with a fourth embodiment of the invention.
Figure 9:
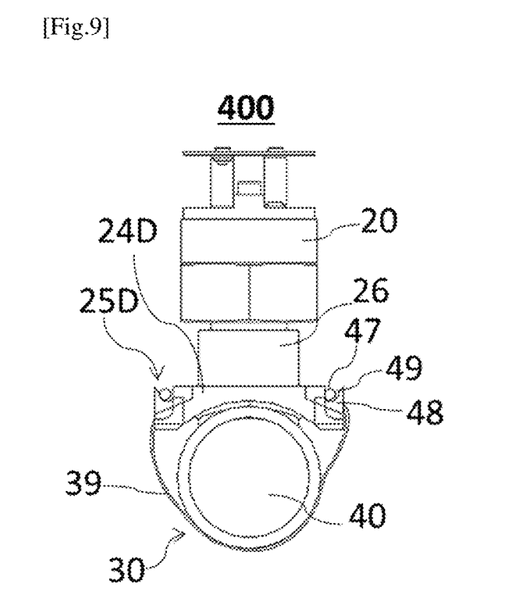
FIG. 9 is a front view of the take-up device of FIG. 8.
Figure 10:
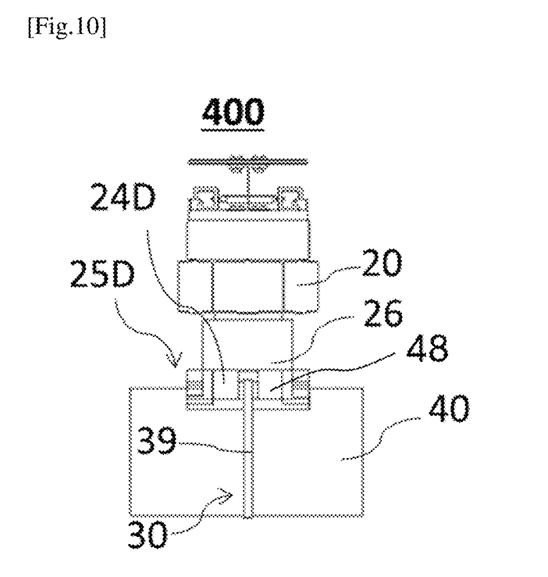
FIG. 10 is a side view of the take-up device of FIG. 8.

As illustrated in FIGS. 8 to 10, in a fourth embodiment, the base 24D comprises two anchoring points 25D on either side of the base 24D. Each anchoring point 25D comprises a housing 49 with a depth of between 0.5 and 1 cm and proportioned to receive a pin 47 with a length of between 1 and 3 cm and a diameter of between 0.1 and 1 cm. In this fourth embodiment, the housing 49 extends over the entire width of the base 24D. The housing 49 is bordered by two lugs 48. Preferably, the upper portion of the lugs 48 may be rounded or bevelled so as to guide the movement of the pin 47 towards the housing 49. The two lugs 48 are separated by a slot, proportioned to allow the cable 39 to pass through but to prevent passage of the pin 47, the pin therefore remaining locked in the housing 49, retained by the lugs 48.

Figure 11:
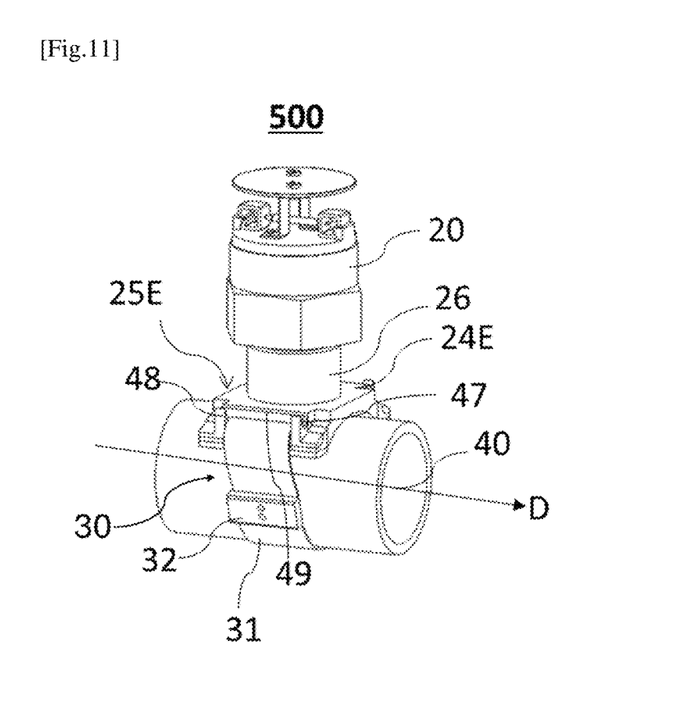
FIG. 11 is a perspective view of a take-up device in accordance with a fifth embodiment of the invention.
Figure 12:
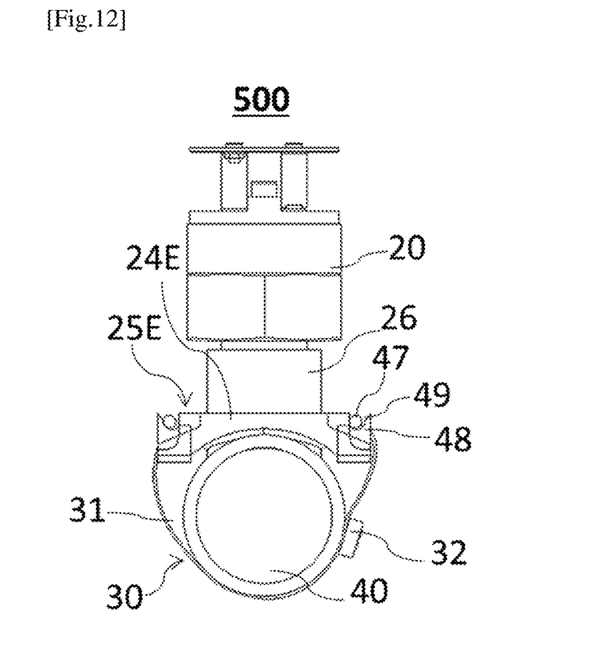
FIG. 12 is a front view of the take-up device of FIG. 11.
Figure 13:
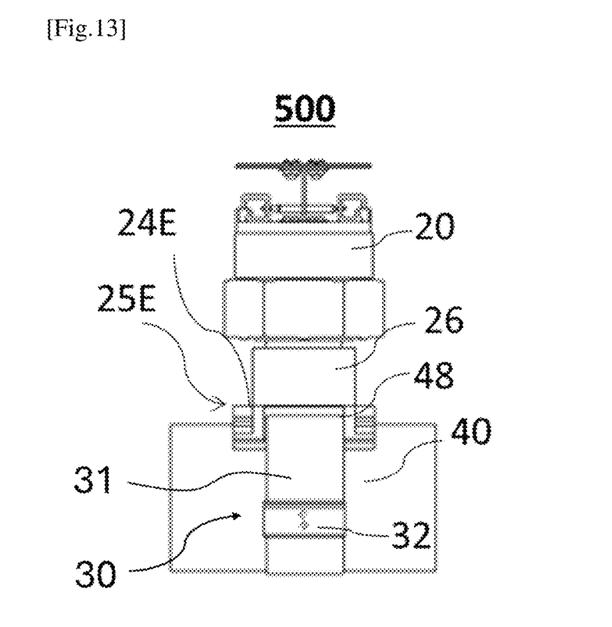
FIG. 13 is a side view of the take-up device of FIG. 11.

As illustrated in FIGS. 11 to 13, in the fifth embodiment, the recess 49 of the anchoring points 25E may be shallower without causing the pin 47 to be extracted. The width of the slot may also be adapted to the width of the elongate element. In this fifth embodiment, the slot is proportioned to allow a strap 31 to pass through.

Figure 14:
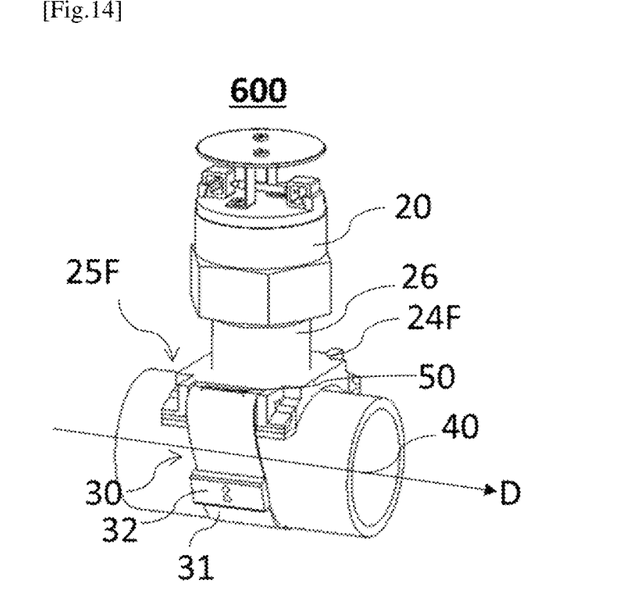
FIG. 14 is a perspective view of a take-up device in accordance with a sixth embodiment of the invention.
Figure 15:
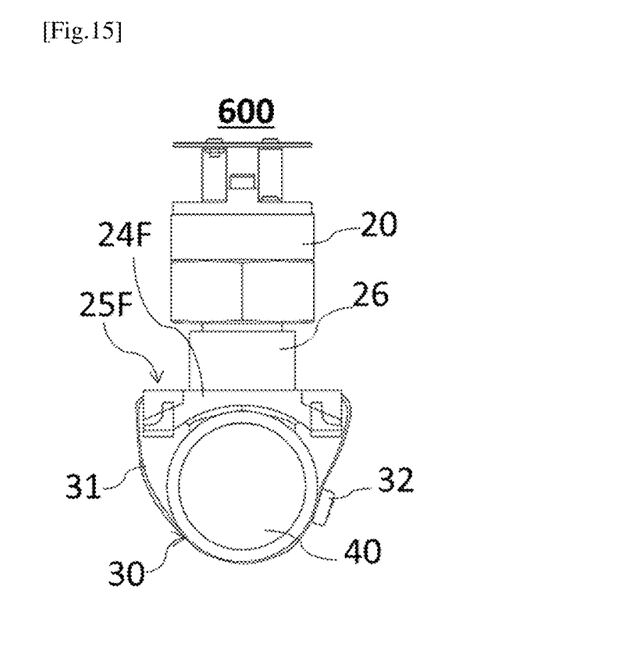
FIG. 15 is a front view of the take-up device of FIG. 14.
Figure 16:
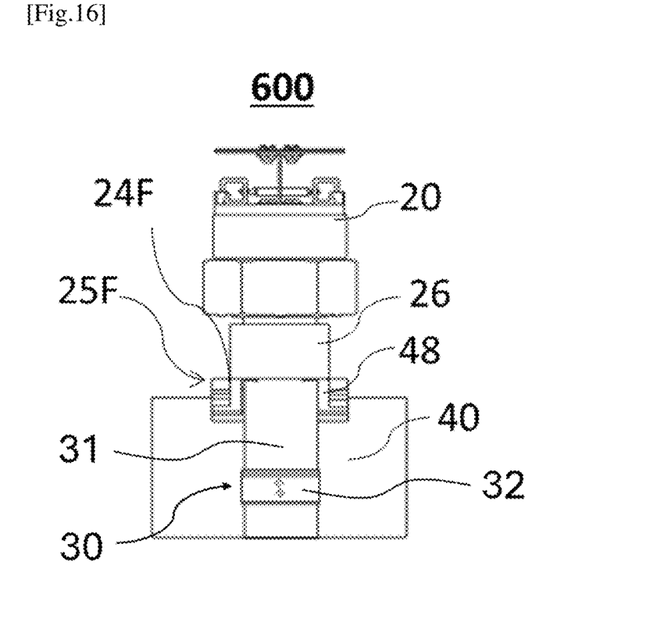
FIG. 16 is a side view of the take-up device of FIG. 14.

As illustrated in FIGS. 14 to 16, in a sixth embodiment, the base 24F has anchoring points 25F comprising a lug 50 intended to cooperate with a hole provided at the ends of the elongate element 31. In order to mount the elongate element on the base 24F, the lugs 50 are inserted into the holes of the elongate element 31 so that it also surrounds the pipeline 50, then the clamp 30 is adapted to the diameter of the pipeline via the adjustment means 32.

Figure 17:
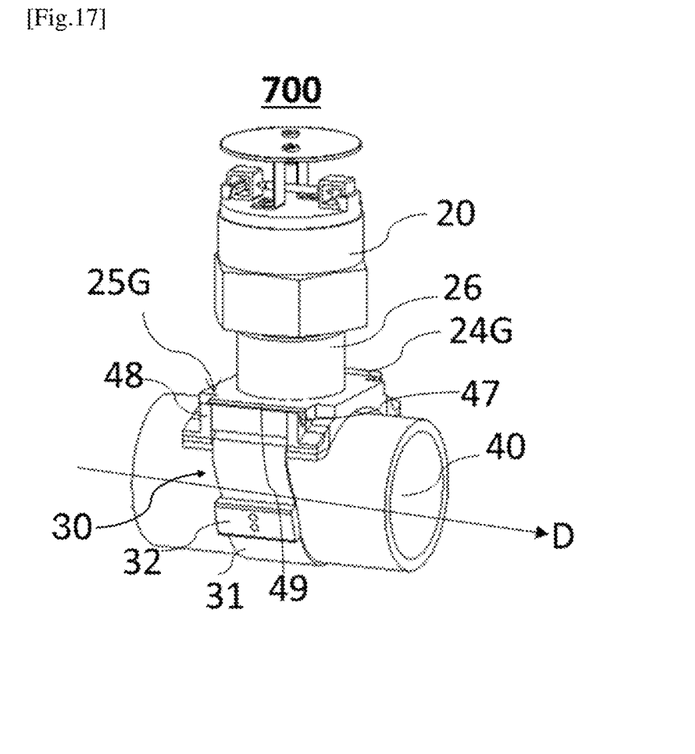
FIG. 17 is a perspective view of a take-up device in accordance with a seventh embodiment of the invention.
Figure 18:
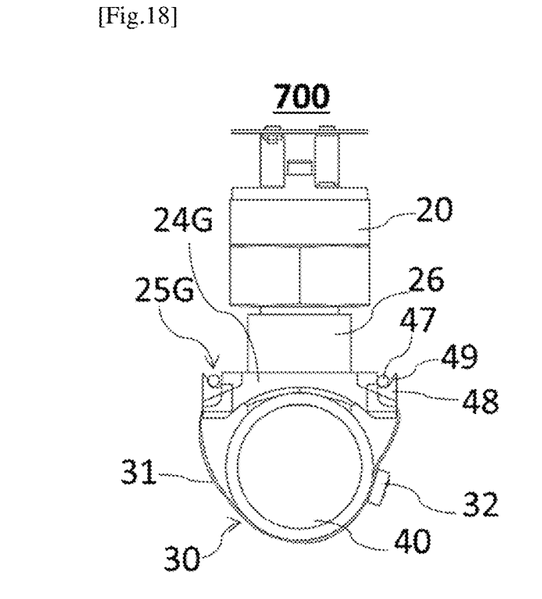
FIG. 18 is a front view of the take-up device of FIG. 17.
Figure 19:
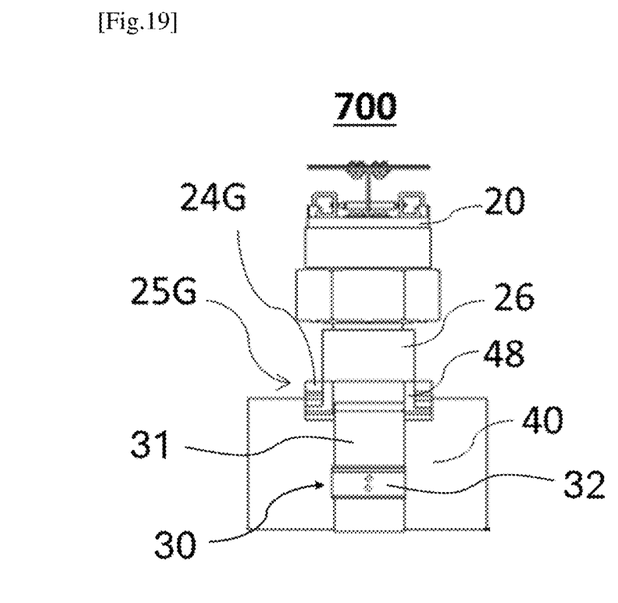
FIG. 19 is a side view of the take-up device of FIG. 17.

As illustrated in FIGS. 17 to 19, in a seventh embodiment, the base 24G has a housing 49 bordered by two lugs 48 separated by a slot, proportioned to allow the width of the elongate element 31 to pass through. The slot is covered with a plate connecting the two lugs 48, thus producing a space with a thickness of between 0.05 and 0.2 cm, not allowing the pin 47 to pass through, but only allowing the elongate element 31 to pass through. Thus, in order to insert the elongate element 31, the pin 49 must first be removed, then the terminal portion of the elongate element 31 is inserted into the slot covered by the plate. The pin 47 is then secured to the end of the elongate element 31, for example by sliding it into a clasp formed at the end of the elongate element 31. Finally, the pin 47 is inserted into the housing 49. The pin 47 therefore cannot be extracted from the housing 49 because it is blocked by the presence of the plate.

In conclusion, the invention makes it possible to obtain a bypass device which can be adapted to several conduit diameters and which is easier and less expensive to use than the devices of the prior art.

The invention claimed is:

1. A take-up device configured to be mounted on an opening of a pipeline, said device comprising:
   a base having a through hole, and
   a seal configured to seal the connection between the opening of said pipeline and the through hole of said base, wherein:
   the base is made of a single piece and further comprises at least two anchoring points, and the device comprises at least one clamping collar produced from a flexible material, the clamping collar comprising:
  an elongate element configured to partially surround the pipeline, said elongate element cooperating with the base at said anchoring points and provided with notches, and
  adjustment means, which are independent of the base and integral with one end of the elongate element, said adjustment means being received or locked by the notches of the elongate element, enabling a length of the elongate element to be adapted so that the device is capable of being mounted on pipelines of different diameters able to withstand pressure comprised between 5 and 20 bar.

2. The device as claimed in claim 1, wherein the device comprises a single clamping collar and only two anchoring points each side of the base comprising one of the two anchoring points.

3. The device as claimed in claim 2, wherein two ends of the elongate element are configured to cooperate with the anchoring points in a manner such that the elongate element partially surrounds the pipeline following action upon the adjustment means.

4. The device as claimed in claim 1, wherein the anchoring points are through openings orientated in a direction parallel to a main direction of the pipeline, the elongate element being mounted on the base by inserting at least one end of the elongate element into the through openings and forming a loop around edges of said base.

5. The device as claimed in claim 4, wherein the through openings are slots provided in the base.

6. The device as claimed in claim 4, wherein the through openings correspond to a space formed between the base and a pin of the base.

7. The device as claimed in claim 1, wherein the elongate element is a strap.

8. The device as claimed in claim 1, wherein the elongate element is a cable.

9. The device as claimed in claim 1, wherein the elongate element is produced from a metallic material.

10. An installation including:
  at least one pipeline with at least one opening, and
  at least one take-up device as claimed in claim 1.

11. The installation as claimed in claim 10, wherein the pipeline is a pipeline which has been painted on its inner and outer faces.

12. The installation as claimed in claim 11, wherein the paint of the pipeline comprises an epoxy polymer binder.

13. The installation as claimed in claim 10, wherein the installation is a fire protection installation.

\* \* \* \* \*